(12) United States Patent
Whitesell, Jr. et al.

(10) Patent No.: US 12,434,461 B2
(45) Date of Patent: *Oct. 7, 2025

(54) DECORATIVE NONWOVEN LAMINATES

(71) Applicant: Auria Solutions UK I Ltd., London (GB)

(72) Inventors: Kenneth Mitchell Whitesell, Jr., Troy, NC (US); Sean Bracken Simmons, Concord, NC (US); Ernest Franklin Wilson, Albemarle, NC (US); Tyler Heath, Mt. Gilead, NC (US)

(73) Assignee: Auria Solutions UK I Ltd., London (GB)

( * ) Notice: Subject to any disclaimer, the term of this patent is extended or adjusted under 35 U.S.C. 154(b) by 377 days.

This patent is subject to a terminal disclaimer.

(21) Appl. No.: 15/921,189

(22) Filed: Mar. 14, 2018

(65) Prior Publication Data
US 2018/0264789 A1 Sep. 20, 2018

Related U.S. Application Data

(60) Provisional application No. 62/472,449, filed on Mar. 16, 2017.

(51) Int. Cl.
*B32B 27/12* (2006.01)
*B32B 5/02* (2006.01)
(Continued)

(52) U.S. Cl.
CPC ............. *B32B 27/12* (2013.01); *B32B 5/022* (2013.01); *B32B 5/06* (2013.01); *B32B 5/26* (2013.01);
(Continued)

(58) Field of Classification Search
CPC .................................. B32B 27/12; D04H 3/03
(Continued)

(56) References Cited

U.S. PATENT DOCUMENTS

| 3,686,046 A | 8/1972 | Crowley |
| 3,819,465 A | 6/1974 | Parsons et al. |

(Continued)

FOREIGN PATENT DOCUMENTS

| EP | 0 764 550 B1 | 11/2002 |
| EP | 2628837 A1 | 8/2013 |

(Continued)

OTHER PUBLICATIONS

Reexamination Control No. 95/001,555 of Jun. 23, 2020. (Year: 2020).*

(Continued)

*Primary Examiner* — Peter Y Choi
(74) *Attorney, Agent, or Firm* — Grossman, Tucker, Perreault & Pfleger, PLLC; Steven J. Grossman

(57) ABSTRACT

A decorative, nonwoven laminate and a method of forming, including a first side of a first nonwoven affixed to one or both of a) a first side of a polymeric sheet or b) a second nonwoven, wherein the first nonwoven exhibits a basis weight of 15 g/m² to 500 g/m² and the second nonwoven exhibits a basis weight of 15 g/m² to 1200 g/m²; and a colorant deposited on a second side of the first nonwoven. A topical coating may or may not be applied to improve durability of the printed surface layer.

6 Claims, 6 Drawing Sheets

(51) Int. Cl.
| | |
|---|---|
| B32B 5/06 | (2006.01) |
| B32B 5/26 | (2006.01) |
| B32B 37/06 | (2006.01) |
| B32B 37/10 | (2006.01) |
| B32B 37/18 | (2006.01) |
| B32B 38/00 | (2006.01) |
| D04H 1/02 | (2006.01) |
| D04H 3/03 | (2012.01) |
| D04H 3/037 | (2012.01) |
| D04H 5/02 | (2012.01) |
| D04H 5/03 | (2012.01) |
| D04H 5/04 | (2006.01) |

(52) U.S. Cl.
CPC .............. *B32B 37/06* (2013.01); *B32B 37/10* (2013.01); *B32B 37/182* (2013.01); *B32B 38/145* (2013.01); *D04H 1/02* (2013.01); *D04H 3/03* (2013.01); *D04H 3/037* (2013.01); *D04H 5/02* (2013.01); *D04H 5/03* (2013.01); *D04H 5/04* (2013.01); *B32B 2255/02* (2013.01); *B32B 2255/26* (2013.01); *B32B 2262/0253* (2013.01); *B32B 2262/0261* (2013.01); *B32B 2262/062* (2013.01); *B32B 2305/20* (2013.01); *B32B 2307/718* (2013.01); *B32B 2317/10* (2013.01); *B32B 2323/043* (2013.01); *B32B 2323/10* (2013.01); *B32B 2377/00* (2013.01); *B32B 2605/003* (2013.01); *D10B 2321/0211* (2013.01); *D10B 2321/022* (2013.01); *D10B 2331/02* (2013.01); *D10B 2331/04* (2013.01); *D10B 2401/041* (2013.01); *D10B 2505/12* (2013.01)

(58) Field of Classification Search
USPC .......................................... 442/59, 101, 148
See application file for complete search history.

(56) References Cited

U.S. PATENT DOCUMENTS

| | | | |
|---|---|---|---|
| 3,846,156 | A | 11/1974 | Seibert et al. |
| 4,283,457 | A | 8/1981 | Kolsky et al. |
| 6,703,086 | B2 | 3/2004 | Kronzer et al. |
| 6,737,114 | B2 | 5/2004 | Dawson et al. |
| 7,067,184 | B1 | 6/2006 | Carkeek |
| 7,833,623 | B2 | 11/2010 | Humphrey, Jr. et al. |
| 9,033,486 | B2 * | 5/2015 | Symkens .............. D21H 17/51 347/102 |
| 2002/0136862 | A1 | 9/2002 | Dong |
| 2003/0198746 | A1 | 10/2003 | Dawson et al. |
| 2003/0228813 | A1 | 12/2003 | Johnson et al. |
| 2004/0023586 | A1 | 2/2004 | Tilton |
| 2004/0248492 | A1 | 12/2004 | Baker, Jr. |
| 2005/0008813 | A1 | 1/2005 | Demott et al. |
| 2006/0240217 | A1 | 10/2006 | Foss |
| 2007/0032156 | A1 | 2/2007 | Bianco et al. |
| 2008/0045101 | A1 | 2/2008 | Near et al. |
| 2009/0256276 | A1 | 10/2009 | Humphrey, Jr |
| 2013/0095304 | A1 | 4/2013 | Takahashi et al. |
| 2014/0242324 | A1 | 8/2014 | Jones et al. |
| 2014/0272343 | A1 | 9/2014 | Mehbubani et al. |
| 2015/0267323 | A1 * | 9/2015 | Frisch .................. D03D 15/513 28/165 |
| 2017/0198431 | A1 | 7/2017 | Ammirati |
| 2018/0144734 | A1 | 5/2018 | Wang |
| 2018/0264789 | A1 | 9/2018 | Whitesell, Jr. et al. |
| 2018/0346738 | A1 | 12/2018 | Zhang |

FOREIGN PATENT DOCUMENTS

| | | | |
|---|---|---|---|
| JP | H07304138 | A | 11/1995 |
| JP | H11179852 | A | 7/1999 |
| JP | 2003241762 | A | 8/2003 |
| JP | 2003251725 | | 9/2003 |
| JP | 2003251725 | A | 9/2003 |
| JP | 2004036097 | A | 2/2004 |
| JP | 2004351763 | A | 12/2004 |
| JP | 2007016378 | | 1/2007 |
| JP | 2007016378 | A | 1/2007 |
| JP | 2011255549 | A | 12/2011 |
| JP | 2014100811 | A | 6/2014 |
| JP | 2015004144 | | 1/2015 |
| JP | 2015004144 | A | 1/2015 |
| JP | 2018039432 | A | 3/2018 |
| WO | 9526878 | A1 | 10/1995 |
| WO | 2006107847 | A2 | 10/2006 |
| WO | 2007070132 | A1 | 6/2007 |
| WO | 2010090093 | A1 | 8/2012 |
| WO | 2017007398 | A1 | 1/2017 |
| WO | 2018170115 | A1 | 3/2018 |

OTHER PUBLICATIONS (Datacolor) "Gray Scale for Color Change and Gray Scale for Staining" (US R/O retrieved from internet Apr. 26, 2018) @ URL: https://www.knowledgebase.datacolor.com/admin/attachments/the_gray_scale_for_color_change_and_gray_scales_for_staining_.pdf>;p. 3, second paragraph cited as A in ISR&WO of PCT/US18/22415 mail date May 16, 2018.

ISR & Written Opinion in related International Appln No. PCT/US18/22415 mail dated May 16, 2018 (10 pgs).

Extended European Search Report dated Nov. 6, 2020 in relation to corresponding European Appl. No. 18767546.7.

International Search Report and Written Opinion of International Application No. PCT/US20/44582, mail date Oct. 29, 2020, 8 pages.

ISO 105-A02: Gray scale for assessing change in colour (Year: 1993).

FLTM BO116-01: Resistance to interior weathering (Year: 2018).

Office Action for U.S. Appl. No. 16/563,244, mail date Mar. 2, 2021, 21 pages.

Examination Report issued by the Intellectual Property Office of India regarding counterpart Indian Application No. 201917041510, dated Mar. 30, 2021 (6 Pages).

Chinese Office Action related to counterpart Application No. 201880026716.5 dated Mar. 16, 2021 (13 Pages).

Final Office Action of U.S. Appl. No. 16/563,244, mail date Oct. 25, 2021, 26 pages.

Second Office Action from related Japanese Appln. No. 2020-500007, dated Nov. 14, 2022. English translation attached.

Office Action from related Korean Appln. No. 10-2019-7030413, dated Jun. 17, 2022. Summary, in English, included.

Office Action of related U.S. Appl. No. 16/563,244, Dated Jul. 18, 2022, 18 pages.

\* cited by examiner

DECORATIVE NONWOVEN LAMINATES

CROSS-REFERENCE TO RELATED APPLICATIONS

This application claims the benefit of U.S. Provisional Patent Application Ser. No. 62/472,449, filed on Mar. 16, 2016, which is fully incorporated herein by reference.

FIELD

The present disclosure is directed to decorative nonwoven laminate, and particularly, to decorative nonwoven scrim laminates for automotive interiors.

BACKGROUND

In an effort to meet fuel-economy regulations, as well as improve recyclability of components utilized in a vehicle while still maintaining the ambiance or perceived comfort of the vehicle, various aspects of automotive interior design are being revamped. One consideration is the modification of the materials utilized in interior applications including the floors, accessory mats, cargo mats, trunk lining, glove box lining, load floor, console and map pocket linings, seatback and trim, package trays, outer wheel arch liners and the visible surfaces of under-body shields.

While non-woven materials may be known for use in laminate construction in, e.g., carpeting applications, room remains for improvement to reduce the thickness and weights of the nonwoven material and in addition, to develop non-woven products where the non-woven itself provides decorative features visible to the consumer. Further, it would be beneficial to provide materials that, while meeting the above goals, provide similar or enhanced durability and color fastness compared to known needle punched nonwoven products.

SUMMARY

An aspect of the present disclosure relates to a method of forming a decorative nonwoven scrim laminate. The method includes affixing a first side of a first nonwoven to at least one of: a) a first side of a polymeric sheet, or b) a second nonwoven to provide a laminate, wherein the first nonwoven exhibits a basis weight of 15 g/m² to 500 g/m² and the second nonwoven exhibits a basis weight of 15 g/m² to 1200 g/m². The method further includes depositing a colorant on a second side of the first nonwoven.

Preferably, when present, the polymeric sheet includes one or more polymeric materials selected from the following: polyethylene, polypropylene, polyester, polyamide, co-polyester, ethyl vinyl acetate, thermoplastic elastomer, thermoplastic olefin, and combinations thereof.

Further, the polymeric sheet and the first nonwoven are preferably laminated upon the application of heat, pressure, or both heat and pressure. In embodiments, the second nonwoven is affixed a second side of the polymeric sheet. In embodiments where the polymeric sheet is omitted, the first nonwoven and the second nonwoven are preferably mechanically bonded.

In any of the above embodiments, the colorant preferably exhibits a fade resistance level of performance of greater than or equal to 225 kJ/m² as measured by ISO 105-A02/AATCC evaluation Procedure 1. Further, the colorant is preferably deposited by screen printing. In addition, the colorant preferably provides a checkered, houndstooth, wood-grain, carbon fiber, camouflage, leather appearance, or other geometric designs.

In addition, in any of the above embodiments, a topical coating is deposited over the colorant and the second side of the first nonwoven.

Further, in any of the above embodiments, the laminate may or may not be formed into a three-dimensional geometry.

In another aspect, the present disclosure relates to a decorative, nonwoven laminate, which is preferably made according to the above described method. The laminate includes a first side of a first nonwoven affixed to at least one of: a) a first side of a polymeric sheet, or b) a second nonwoven, wherein the first nonwoven exhibits a basis weight of 15 g/m² to 500 g/m² and the second nonwoven exhibits a basis weight of 15 g/m² to 1200 g/m². The laminate also includes a colorant deposited on a second side of the first nonwoven.

In preferred embodiments, the colorant exhibits a fade resistance level of performance of greater than or equal to 225 kJ/m² as measured by ISO 105-A02/AATCC evaluation Procedure 1. The colorant also preferably provides a checkered, houndstooth, wood-grain, carbon fiber, camouflage, leather appearance, or other geometric designs.

In any of the above embodiments, the polymeric sheet is one or more polymeric materials selected from the following: polyethylene, polypropylene, polyester, polyamide, co-polyester, ethyl vinyl acetate, thermoplastic elastomer, thermoplastic olefin, and combinations thereof. In embodiments, the second nonwoven is affixed to a second side of the polymeric sheet.

It is also noted that the first nonwoven preferably exhibits a thickness in the range of 0.1 mm to 6.0 mm and an areal density in the range of 15 grams per square meter to 500 grams per square meter. Further, when present, the polymeric sheet preferably exhibits a thickness in the range of 0.1 mm to 4.0 mm and an areal density in the range of 30 grams per square meter to 5,000 grams per square meter. Also, when present, the second nonwoven exhibits a thickness in the range of 0.1 mm to 12.0 mm and an areal density in the range of 15 grams per square meter to 1200 grams per square meter.

In any of the above embodiments, a topical coating is deposited on the colorant and the second side of the first nonwoven.

Further, in any of the above embodiments, the laminate may or may not exhibit a three-dimensional geometry.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1:
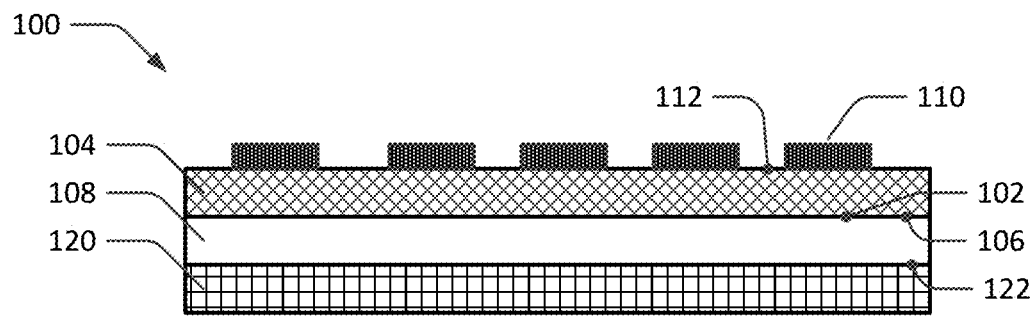
FIG. 1 is a schematic illustration of an embodiment of a decorative, nonwoven scrim laminate including a polymeric sheet.

The present disclosure is directed to decorative, nonwoven laminates, and particularly, patterned, nonwoven laminates for automotive interiors. The decorative, nonwoven scrim laminates preferably include a spunbond, spunlace, or needlepunched nonwoven scrim layer affixed to a) first side of a polymeric sheet or b) a second nonwoven and a colorant deposited on the second side of the nonwoven scrim layer.

The decorative, nonwoven laminates allow for the use of scrims, commonly used on the backside of automotive textiles, as the decorative face layer. Further, the decorative, nonwoven scrim is relatively lighter than the nonwoven needle punched materials presently utilized in comparable applications. In addition, the method of forming the decorative, nonwoven laminates herein expands the color options and pattern options, even to patterns such as woodgrain and camouflage. Finally, the laminates herein achieve a fade resistance level of performance equal to or greater than 225 kJ/m² as measured by ISO 105-A02/AATCC evaluation Procedure 1.

As noted above, and illustrated in FIG. 1, the decorative, nonwoven laminate 100 generally includes a first side 102 of a first nonwoven layer 104 affixed to a first side 106 of a polymeric sheet 108. A colorant 110, such as paint, stain, pigment, or an ink, is deposited on the second side 112 of the first nonwoven 104, which opposes the first side of the nonwoven.

The first nonwoven layer is itself preferably spunbond, spunlace, or needlepunched scrim and formed from fibers that are preferably sourced from a thermoplastic polymer material, such as but not limited to polypropylene, high density polyethylene (e.g. 0.94 g/cc to 0.96 g/cc), low density polyethylene (0.91 g/cc to 0.92 g/cc), linear low density polyethylene (e.g. 0.93 g/cc), polyester, polyamides (including nylon 6 and nylon 6,6), glycol modified polyethylene terephthalate (PETg), or combinations thereof. The fibers also preferably exhibit a denier in the range of 0.7 denier to 45 denier, including all values and ranges therein. The use of the term scrim herein, may be understood to indicate a web-like product. That is, the fibers lay on top of one another. A spunbond is reference to a nonwoven where the fibers are spun and then dispersed into a web, e.g., by utilizing deflectors or they may be directed by air streams. A spunlace nonwoven is reference to formation of entanglement in the nonwoven that is preferably provided by water jets, the resulting bonded material being a nonwoven that has isotropic properties, meaning substantially similar strength in any direction. Needlepunched is reference to a nonwoven where the fibers are mechanically entangled, which is achieved by repeated penetration of barbed needles through a fibrous web.

The first nonwoven layer 104 may exhibit a thickness in the range of 0.1 mm to 6.0 mm, including all values and ranges therein, and an areal density in the range of 15 grams per square meter to 500 grams per square meter, including all individual values and ranges therein. For example, the first nonwoven may preferably have an areal density in the range of 35 grams per square meter to 200 grams per square meter, or 50 grams per square meter to 150 grams per square meter, or 50 grams per square meter to 100 grams per square meter. The particular thicknesses and areal densities may depend on the application for which the first nonwoven scrim layer is selected.

For example in trunk applications, the first nonwoven layer preferably exhibits a thickness in the range of 0.1 to 6.0 mm, including all values and ranges therein, and an areal density in the range of 15 grams per square meter to 500 grams per square meter, including all values and ranges therein. Preferably for a trunk application, the first nonwoven layer can have an areal density in the range of 60 grams per square meter to 130 grams per square meter, and even more preferably, in the range of 60 grams per square meter to 90 grams per square meter.

For flooring applications, the thickness of the first nonwoven layer herein is preferably in the range of 0.1 to 6.0 mm, including all values and ranges therein, and the areal density of the first nonwoven is preferably in the range of 60 grams per square meter to 200 grams per square meter, more preferably in the range of 60 grams per square meter to 150 grams per square meter, and even in the range of 60 grams per square meter to 130 grams per square meter.

The polymeric sheet is preferably a thermoplastic polymer such as but not limited to polyethylene (such as high density polyethylene (e.g. 0.94 g/cc to 0.96 g/cc), low density polyethylene (0.91 g/cc to 0.92 g/cc), or linear low density polyethylene (e.g. 0.93 g/cc)), polypropylene, ethyl vinyl acetate, thermoplastic elastomer, thermoplastic olefin, polyester, co-polyester, polyamides (such as nylon 6 and nylon 6,6) or combinations thereof. In embodiments, the thermoplastic polymer may be crosslinked, or a thermoset polymer may alternatively be utilized. The polymeric sheet preferably exhibits a thickness in the range of 0.1 mm to 4.0 mm, including all values and ranges therein, and an areal density in the range of 30 gsm to 5000 gsm, including all values and ranges therein.

One or more colorants are used to form the visible decorative appearance on the first nonwoven layer for viewing by the consumer. The colorants preferably include inks, paints or stains such as pigment dyes. The colorants are preferably deposited at thickness in the range of 0.01 mm to 0.3 mm. In particularly preferred embodiments, the colorants are deposited in patterns, such as checkered, houndstooth, wood grain, carbon fiber, leather, camouflage, or other geometric designs, which may be understood herein as designs including one or more geometric shapes. While the figures (see FIGS. 1 through 2) illustrate the placement of the colorant in discrete locations on the surface of the first nonwoven layer as in the case of the identified patterns, it should be appreciated that the colorant (or multiple colorants) may also be applied to the entire face of the first nonwoven layer to form a colorant layer. Colorants may include black, gray, and white, as well as a number of other colors.

Figure 2:
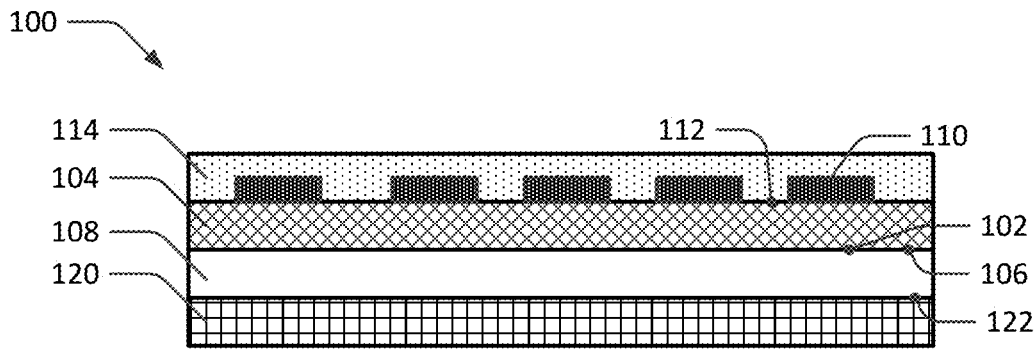
FIG. 2 is a schematic illustration of an embodiment of a decorative, nonwoven scrim laminate including a polymeric sheet, optional second nonwoven, and a topical coating.

As illustrated in FIG. 2, the laminate 100 optionally includes a topical coating 114 deposited on the first nonwoven 104 and the polymeric sheet 108, to enhance the overall durability of the first nonwoven material. The topical coating 114 may include, for example, thermoplastic elastomers, thermoplastic olefins, polyurethane, high density polyethylene, polypropylene, or glycol modified polyethylene terephthalate (PETg) or a combination thereof. The topical coatings 114, when present, exhibit a thickness in the range of 0.1 mm to 3.0 mm, including all values and ranges therein. Topical coating weight can range from 15 gsm to 340 gsm, more specifically between 30 gsm and 100 gsm. Topical layer can be slick or have a grain applied to improve traction on the surface of the floor. Taber abrasion testing for the flooring with topical coatings can be as high as 15,000 cycles using (H18 wheel, 1000 gm weight) compared to a best in class nonwoven at 1500 cycles using (H18 wheel, 1000 gm weight). Testing for taber is based on SAE J1530 and/or ASTM D3884.

In other embodiments, binder fibers maybe utilized to enhance the durability of the first nonwoven layer.

In any of the above embodiments, a second nonwoven layer 120 is optionally affixed to the second surface of the polymeric sheet 122 as illustrated in FIGS. 1 through 2. The second nonwoven may be a spunbond, spunlace, needlepunched, or airlaid nonwoven. Preferably, the second nonwoven exhibits a basis weight in the range of 15 grams per square meter to 1200 grams per square meter, including all values and ranges therein, and a thickness in the range of 0.1 mm to 12.0 mm, including all values and ranges therein. The fibers forming the second nonwoven are preferably formed from a thermoplastic material such as but not limited to polyester, cotton, co-polyester, high density polyethylene (e.g. 0.94 g/cc to 0.96 g/cc), low density polyethylene (0.91 g/cc to 0.92 g/cc), linear low density polyethylene (e.g. 0.93 g/cc), polypropylene, polyamide (such as nylon 6 or nylon 6,6), glycol modified polyethylene terephthalate (PETg), and combinations of thereof. In addition, the fiber denier is preferably in the range of 0.7 denier to 45 denier, including all values and ranges therein.

The nonwoven laminates are preferably formed herein by affixing the first nonwoven to a first side of the polymeric sheet. The first nonwoven may be affixed by a number of methods including extruding the polymeric sheet directly onto the first nonwoven, allowing some interlocking of the fibers into the polymeric sheet while the polymeric sheet is still molten. In particularly preferred embodiments, the first nonwoven and polymeric sheet are laminated together wherein heat, pressure, or both heat and pressure are applied to the first nonwoven and polymeric sheet. In addition, or alternatively, a layer of adhesive may be provided between the first nonwoven and the polymeric sheet to join the layers together. When present, the second nonwoven layer may also be laminated to the polymeric sheet. The second nonwoven layer may be affixed to the polymeric sheet at the same time, before, or after the first nonwoven is affixed to the polymeric sheet.

Figure 3:
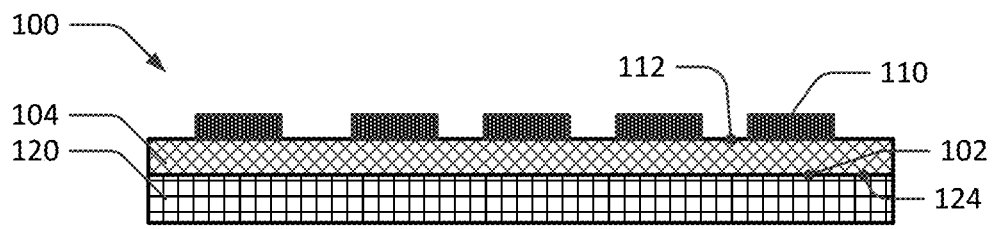
FIG. 3 is a schematic illustration of an embodiment of a decorative, nonwoven scrim laminate including a second nonwoven.

In embodiments, the polymeric sheet may be omitted from the laminates as illustrated in FIG. 3. In such embodiments, the decorative, nonwoven laminate 100 generally includes a first side 102 of a first nonwoven layer 104 affixed to a first side 124 of a second nonwoven 120. Similar to the above, a colorant 110, such as paint, stain, pigment, or an ink, is deposited on the second side 112 of the first nonwoven 104, which opposes the first side of the nonwoven.

Again, the first nonwoven layer is itself preferably spunbond, spunlace or needlepunched scrim and formed from fibers that are preferably sourced from a thermoplastic polymer material, such as but not limited to polypropylene, high density polyethylene (e.g. 0.94 g/cc to 0.96 g/cc), low density polyethylene (0.91 g/cc to 0.92 g/cc), linear low density polyethylene (e.g. 0.93 g/cc), polyester, polyamides (including nylon 6 and nylon 6,6), glycol modified polyethylene terephthalate (PETg), or combinations thereof. The fibers also preferably exhibit a denier in the range of 0.7 denier to 45 denier, including all values and ranges therein. The use of the term scrim herein, may be understood to indicate a web-like product.

Similar to the above embodiments, the first nonwoven layer 104 may exhibit a thickness in the range of 0.1 mm to 6.0 mm, including all values and ranges therein, and an areal density in the range of 15 grams per square meter to 500 grams per square meter, including all individual values and ranges therein. For example, the first nonwoven may preferably have an areal density in the range of 35 grams per square meter to 200 grams per square meter, or 50 grams per square meter to 150 grams per square meter, or 50 grams per square meter to 130 grams per square meter. The particular thicknesses and areal densities may depend on the application for which the first nonwoven scrim layer is selected.

Again, in trunk applications, the first nonwoven layer preferably exhibits a thickness in the range of 0.2 to 1.0 mm, including all values and ranges therein, and an areal density in the range of 50 grams per square meter to 100 grams per square meter, including all values and ranges therein. Preferably for a trunk application, the first nonwoven layer can have an areal density in the range of 60 grams per square meter to 130 grams per square meter, and even more preferably, in the range of 60 grams per square meter to 90 grams per square meter. For flooring applications, the thickness of the first nonwoven layer herein is preferably in the range of 0.2 to 1.5 mm, including all values and ranges therein, and the areal density of the first nonwoven is preferably in the range of 60 grams per square meter to 200 grams per square meter, more preferably in the range of 60 grams per square meter to 150 grams per square meter, and even in the range of 60 grams per square meter to 130 grams per square meter. The second nonwoven layer 120 affixed to the first surface 102 of the nonwoven 104 is preferably a spunbond, spunlace, needlepunched, or airlaid nonwoven and exhibits a basis weight in the range of 15 grams per square meter to 1200 grams per square meter, including all values and ranges therein, and a thickness in the range of 0.1 mm to 12.0 mm, including all values and ranges therein. The fibers forming the second nonwoven are preferably formed from a thermoplastic material such as but not limited to polyester, cotton, co-polyester, high density polyethylene (e.g. 0.94 g/cc to 0.96 g/cc), low density polyethylene (0.91 g/cc to 0.92 g/cc), linear low density polyethylene (e.g. 0.93 g/cc), polypropylene, polyamide (such as nylon 6 or nylon 6,6), glycol modified polyethylene terephthalate (PETg), and combinations of thereof. In addition, the fiber denier is preferably in the range of 0.7 denier to 45 denier, including all values and ranges therein.

Again, one or more colorants are used to form the visible decorative appearance on the first nonwoven layer for viewing by the consumer. The colorants preferably include inks, paints or stains such as pigment dyes. The colorants are preferably deposited at thickness in the range of 0.01 mm to 0.3 mm. In particularly preferred embodiments, the colorants are deposited in patterns, such as checkered, houndstooth, wood grain, carbon fiber, leather, camouflage, or other geometric designs. While the figures (see FIGS. 3 through 5) illustrate the placement of the colorant in discrete locations on the surface of the first nonwoven layer as in the case of the identified patterns, it should be appreciated that the colorant (or multiple colorants) may also be applied to the entire face of the first nonwoven layer to form a colorant layer. Colorants may include black, gray, and white, as well as a number of other colors.

Figure 4:
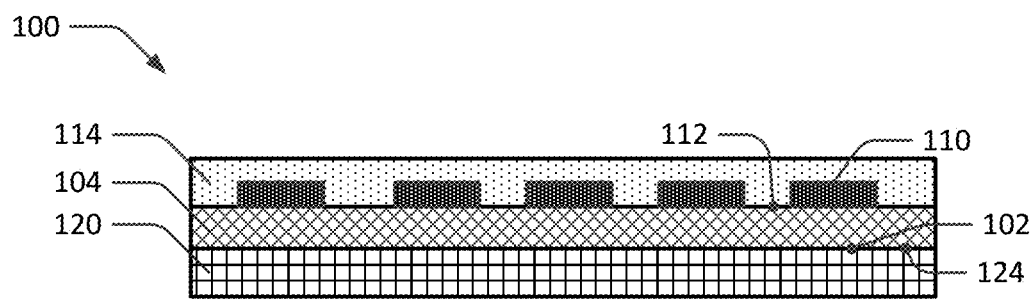
FIG. 4 is a schematic illustration of an embodiment of a decorative, nonwoven scrim laminate including a second nonwoven and a topical coating.

As illustrated in FIG. 4, the laminate 100 optionally includes a topical coating 114 deposited on the first nonwoven 104 and colorant 110 to enhance the overall durability of the first nonwoven material. Again, the topical coating 114 may include, for example, thermoplastic elastomers, thermoplastic olefins, polyurethane, high density polyethylene, polypropylene, or glycol modified polyethylene terephthalate (PETg). The topical coatings 114, when present, exhibit a thickness in the range of 0.1 mm to 3.0 mm, including all values and ranges therein. Topical coating weight can range from 15 gsm to 340 gsm, more specifically between 30 gsm and 100 gsm. Topical layer can be slick or have a grain applied to improve traction on the surface of the floor. Taber abrasion testing for the flooring with topical coatings can be as high as 15,000 cycles using (H18 wheel, 1000 gm weight) compared to a best in class nonwoven at 1500 cycles using (H18 wheel, 1000 gm weight). Testing for taber is based on SAE J1530 and/or ASTM D3884.

In other embodiments, binder fibers may be utilized to enhance the durability of the first nonwoven layer.

The above nonwoven-nonwoven laminates are preferably formed herein by a number of mechanical bonding methods including forming the second nonwoven directly onto the first nonwoven, allowing some interlocking of the fibers of the nonwovens, or by needling the first nonwoven layer into the second nonwoven using an entanglement process, such as needlepunching or hydroentangling. In other embodiments, the nonwovens may be laminated together with the application or heat, pressure, or both heat and pressure. In addition, or alternatively, a layer of adhesive may be provided between the nonwovens to join the layers together.

Figure 5:
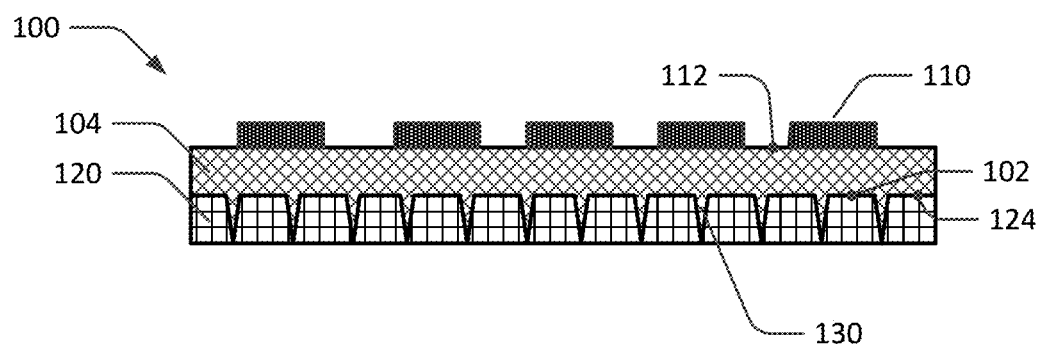
FIG. 5 is a further schematic illustration of yet a further embodiment of the decorative, nonwoven scrim laminate.

FIG. 5 illustrates preferred embodiments where the first nonwoven 104 and second nonwoven 120 are needlepunched or hydroentangled. As illustrated, a portion of the fibers 130 of the first nonwoven are pushed into and, in some embodiments, through the second nonwoven, vice-versa where the fibers of the second nonwoven are pushed into the first nonwoven, or both. This mechanically interlocks the nonwovens, without the need for providing additional adhesive materials. However, such adhesive materials may also be added to promote durability.

In any of the above embodiments, either before or after forming the laminates, the colorant is deposited on the first nonwoven. One or more layers of colorant may be applied by the printing process to create a desired decorative appearance as noted above. In preferred embodiments, the colorant is deposited on the nonwoven utilizing a printing process, and in particularly preferred embodiments a screen printing process is employed. Additionally, or alternatively, other printing processes may be utilized, such as flexographic printing or pad printing. If a topical coating is applied, the topical coating is applied after the colorant has been deposited.

In addition, any of the above laminate sheets may be formed into a three-dimensional geometry using pressure, the application of heat, or a combination of heat and pressure before, after, or when the colorant is applied. Such methods may, therefore, include thermoforming, compression molding, and vacuum forming. The three-dimensional geometries are understood herein as being three-dimensional as they may include projections or depressions extending from the laminate sheets.

Automotive vehicles may, therefore, include the decorative, nonwoven laminates described herein to aid in achieving the goal of weight reduction while still maintaining the performance characteristics of previously utilized needle punched face fabrics. The nonwoven laminates may be utilized in flooring, accessory mats, cargo mats, trunk lining, glove box lining, console and map pocket lining, seatback and trim, package trays, outer wheel arch liners, and visible surfaces of under-body shields. The decorative, nonwoven laminates may be utilized in other applications where non-wovens currently provide decorative layers.

While the resultant laminates exhibit relatively light weights, including a 53% weight reduction in trunk materials, Taber wear characteristics, particularly for trunks, has been maintained and has passed OEM requirements of (H10 500 g 1200 cycles). Testing for taber is based on SAE J1530 and/or ASTM D3884.

Further, the laminates also pass OEM fade tests and exhibit a resistance to fade, as measured by ISO 105-A02/AATCC evaluation procedure 1, (and FLTM BO 116-01), of at least 225 kJ per square meter and up to 451 kJ per square meter for using a xenon test system. The results are visually obtained by gray scale and must pass a minimum ranking of 4.

Figure 6:
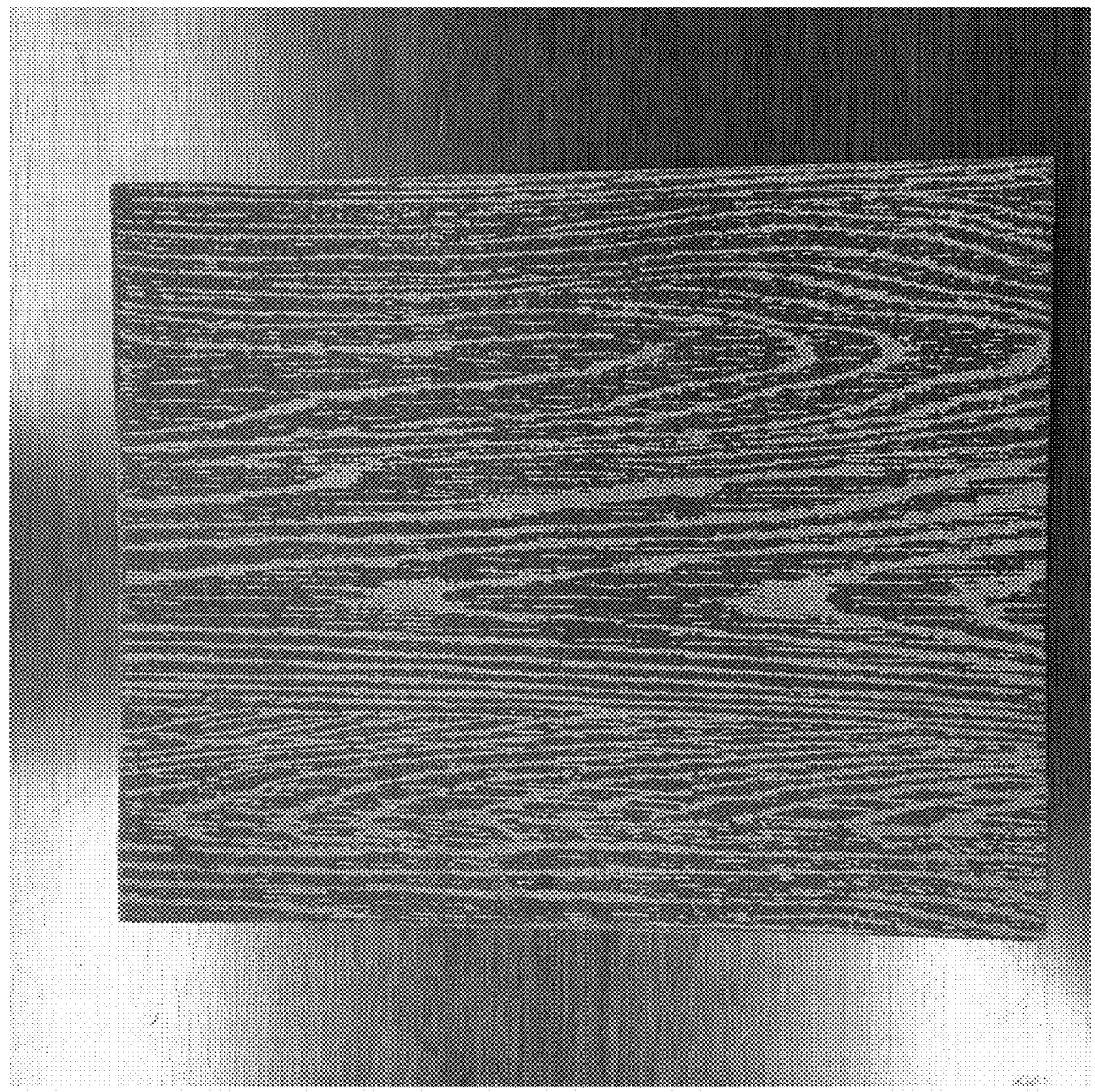
FIG. 6 is a photograph of an embodiment of the decorative, nonwoven scrim laminate.
Figure 7:
FIG. 7 is a photograph of an embodiment of the decorative, nonwoven scrim laminate formed into a three-dimensional geometry.
Figure 8:
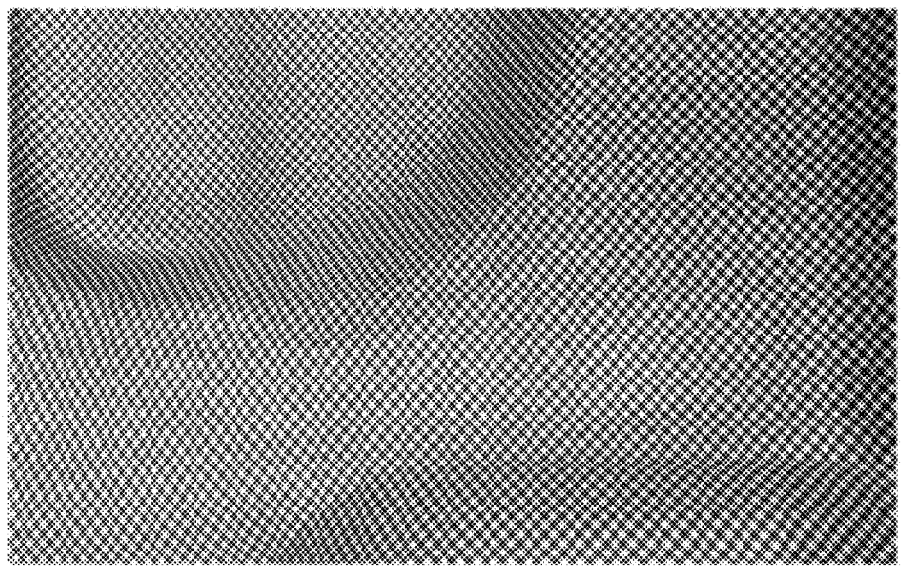
FIG. 8 is a photograph of an alternate design with topical coating formed into a three-dimensional geometry.
Figure 9:
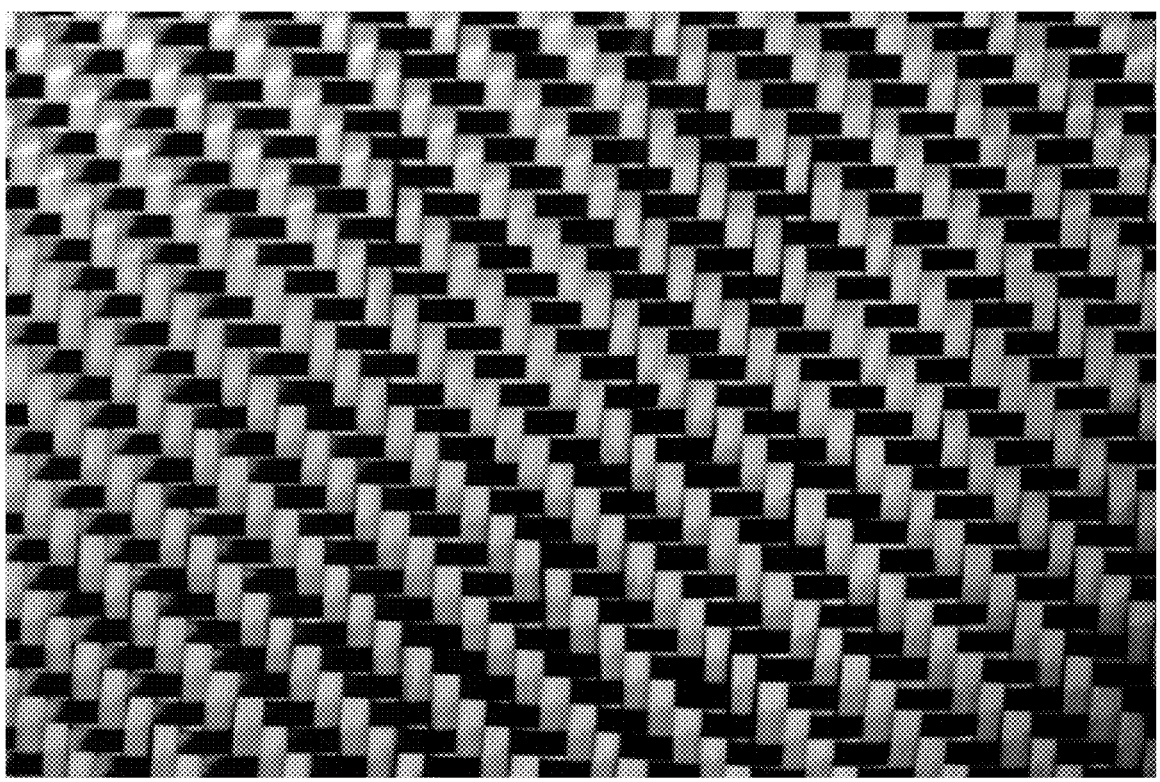
FIG. 9 is a photograph of a carbon fiber design.

FIG. 6 illustrates a photograph of an embodiment of a laminate as described herein including a wood grain pattern imposed on the surface of the first non-woven, which in this case is spunbond. In addition to being in the form of a sheet, which exhibits what is referred to herein as a two-dimensional geometry, the laminate may also be formed into what is understood herein to be a three dimensional geometry, as illustrated in the photograph of an embodiment of the laminate provided in FIG. 7. The three dimensional geometries may assume the shape of any automotive component where such nonwovens may be employed such as, but not limited to floors, trunk liners, glove box liners, load floors, console and map pocket liners, seatback and trim, package trays, outer wheel arch liners and visible surfaces of under-body shields.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A decorative, nonwoven vehicle interior laminate, comprising:
 a first side of a first nonwoven affixed to a first side of a single polymeric sheet;
 wherein said first nonwoven has a thickness in the range of 0.1 mm to 1.8 mm and a basis weight of 50 g/m$^2$ to 200 g/m$^2$ and said polymeric sheet has a thickness in the range of 0.3 mm to 2.0 mm and a basis weight at an areal density in the range of 150 g/m$^2$ to 1200 g/m$^2$;
 a colorant selected from an ink, paint or pigment dye deposited on the surface of a second side of said first nonwoven at a thickness of 0.01 mm to 0.3 mm;
 a topical coating applied on said colorant and said second side of said first nonwoven at a thickness of 1.1 mm to 3.0 mm;
 a second nonwoven affixed to a second side of said polymeric sheet, wherein said second nonwoven has a thickness of 2.0 mm to 12.0 mm and a basis weight of 300 g/m$^2$ to 1200 g/m$^2$; characterized by the feature that said first nonwoven, said polymer sheet and said second nonwoven are attached together and said decorative nonwoven laminate has a three-dimensional geometry including projections or depressions;

wherein said laminate with said colorant has a minimum fade resistance ranking of 4 in a xenon test system at 225 kJ/m$^2$ to 451 kJ/m$^2$ as measured by ISO 105-A02/AATCC evaluation Procedure 1 and a Taber abrasion of 15,000 cycles using an H18 wheel and 1000 gm weight according to ASTM D3884 or SAE J1530 and said laminate with said three-dimensional geometry is a vehicle interior component.

2. The decorative, nonwoven laminate of claim 1, wherein said polymeric sheet is one or more polymeric materials selected from the following: polyethylene, polypropylene, polyester, polyamide, co-polyester, ethyl vinyl acetate, thermoplastic elastomer, thermoplastic olefin, and combinations thereof.

3. The decorative laminate of claim 1 wherein said colorant is deposited at discrete locations on the surface of said second side of said first nonwoven.

4. The decorative laminate of claim 1 wherein said first nonwoven has a thickness of 0.4 mm to 1.5 mm.

5. The decorative laminate of claim 1 wherein said topical coating applied on said colorant comprises a thermoplastic elastomer, thermoplastic olefin, polyurethane, high density polyethylene, polypropylene, or glycol modified polyethylene terephthalate.

6. The decorative laminate of claim 1 wherein said topical coating comprises polyurethane at a basis weight of 15 gsm to 340 gsm.

* * * * *